United States Patent [19]

Barnett

[11] Patent Number: 4,998,374
[45] Date of Patent: * Mar. 12, 1991

[54] ROTATING FISHING LURE SPREADER FOR USE WHILE TROLLING

[76] Inventor: O. Lynn Barnett, 39 Elora Ave., Akron, Ohio 44319

[*] Notice: The portion of the term of this patent subsequent to May 1, 2007 has been disclaimed.

[21] Appl. No.: 502,108

[22] Filed: Mar. 29, 1990

[51] Int. Cl.⁵ ............................................ A01K 91/00
[52] U.S. Cl. .................................................... 43/42.74
[58] Field of Search .................. 43/42.74, 42.51, 43.13

[56] References Cited

U.S. PATENT DOCUMENTS

| | | | |
|---|---|---|---|
| 3,190,029 | 6/1965 | Bondi | 43/42.74 |
| 3,270,458 | 1/1965 | McAfee | 43/42.74 |
| 3,529,376 | 9/1970 | Parmeson | 43/42.51 |
| 3,991,505 | 11/1976 | Simiti | 43/42.74 |
| 4,671,007 | 6/1987 | Stanczyk | 43/42.74 |
| 4,920,687 | 5/1990 | Barnett | 43/42.74 |

Primary Examiner—Richard K. Seidel
Assistant Examiner—Chuck Y. Mah
Attorney, Agent, or Firm—Donald A. Bergquist

[57] ABSTRACT

A fishing device known as a spreader for trolling a plurality of baited hooks from a single fishing line wherein the spreader is a planar device with sweep arms extending from the body of the planar device and vanes that cause it to rotate as it moves relative to the water, thereby causing at least two fishing lures attached to the sweep arms to move in a helical pattern simulating the motion of fish swimming together. The hydrodynamic design provides for smooth operation in the water and reduces the propensity for the fishing lures to become entangled. The sweep arms pivot from a use position, in which position the arms are extended, to a storage position, in which position the arms are juxtaposed.

11 Claims, 1 Drawing Sheet

U.S. Patent   Mar. 12, 1991   Sheet 1 of 1   4,998,374
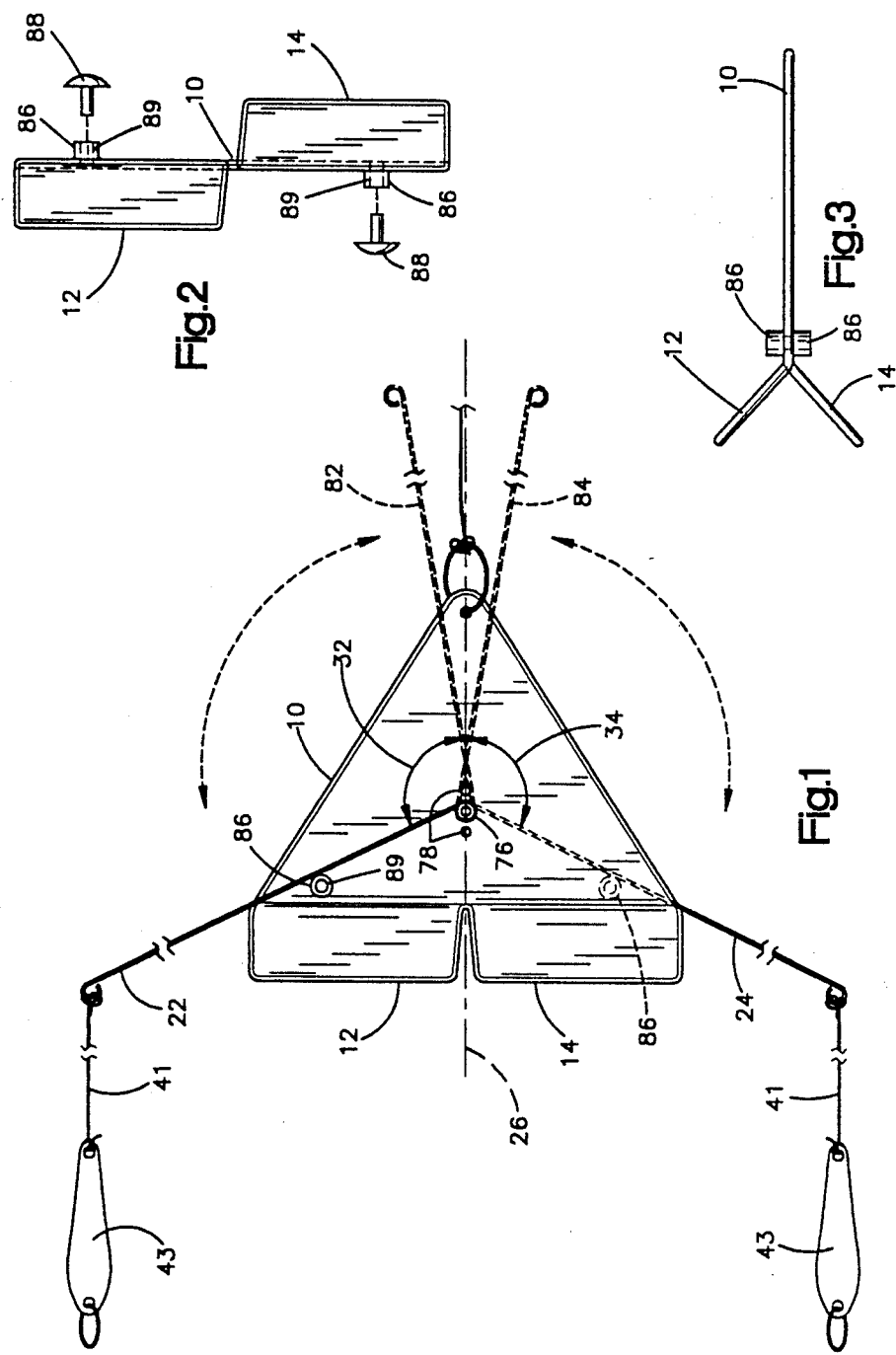

ROTATING FISHING LURE SPREADER FOR USE WHILE TROLLING

INTRODUCTION

A fish device known as a spreader for trolling a plurality of baited hooks from a single fishing line wherein the spreader comprises a planar device with vanes that cause it to rotate as it moves relative to the water, thereby causing at least two baited hooks to move in a helical pattern simulating the motion of fish swimming together. The basic device is the subject of copending U.S. patent application No. 07/373,266, filed 06/29/89. The present application describes an improvement whereby sweep arms radiating from the rotating planar device pivot at their point of attachment thereto for the purpose of folding the spreader for transporting and storage thereof.

BACKGROUND

Several inventors have provided spreaders by which two or more baited hooks may be connected to a single fishing line. Other inventors have created spreaders that cause the baited hooks to rotate about one another as the fish line is 'jigged' up and down in the water. Some of these inventors suggest that their devices can also be used for slow trolling. The present invention is fully capable of smooth operation during trolling at slow, moderate, or high speeds. The sweep arms of the present invention are adjustable in angle and are interchangeable to provide arms of various lengths as might be desired, just as those in my co-pending U.S. patent application Ser. No. 07/373,266, filed 06/29/89, which is made a part hereof by reference thereto. The improvement I herein disclose makes the new spreader more convenient by providing sweep arms that individually pivot about their point of attachment to the planar body of the spreader. Thereby allowing the sweep arms to be moved into close juxtaposition with one another for minimizing the space required for storing the spreader when it is not in use.

PRIOR ART

Spreaders and even rotating spreaders have been taught in the prior art. The following discussion summarizes the spreaders uncovered in searching the U.S. Patent Offices's Classification No. 43/42.74, SPREADERS OR SEPARATORS FOR PLURAL LINES AND/OR HOOKS.

A basic spreader is presented in U.S. Pat. No. 2,733,536, issued to Terazono. Two arms are telescopically adjustable in length and a third arm is provided for the attachment of a third fish hook. Provision exists to reduce the overall dimensions of this spreader of storage by telescoping two principal sweep arms. In contrast to Terazono's spreader, the sweep arms of the present invention do not telescope, but pivot about their point of attachment to the planar body of the spreader to provide firstly a use position, wherein in the sweep arms are spread far apart, and secondly a collapsed or folded position, wherein the sweep arms are juxtaposed. Such motion is permitted by the fact that the body is planar; non-planar bodies are not seen to provide such motion of the sweep arms. In addition to the basic spreader of my prior application being patentably different from Terazono, the improvement is not suggested by Terazono, save for the desirability of reducing size for storage.

The Terazono spreader was modified somewhat in U.S. Pat. No. 2,930,159, issued to Culhane. The Culhane device has two arms of the telescopically extendable type taught by Terazono; when the spreader is in use, however, Culhane teaches that the arms are frictionally locked in the extended position. To contrast the present invention from Culhane's spreader, applicant points to the previous discussion of the Terazono patent. In addition to the basic spreader of my prior application being patentably different from Culhane, the improvement is not suggested by Culhane, save for the desirability of reducing size for storage.

The earliest rotating spreader uncovered in the preliminary search is that shown in U.S. Pat. No. 2,223,922, issued to Schofield. Schofield provides a single length of wire having suitable stiffness to form two arcuate sweep arms. A metal strip strip is formed in a shape resembling a propeller attached to the sweep arms and following the arc of the sweep arms to provide rotational forces to cause to spreader to rotate and thereby to cause the bait or lures attached to the ends of the sweep arms to revolve around a central axis. In contrast to the present invention, no provision in Schofeld's spreader suggests collapsing, folding, or telescoping the sweep arms for storage of the spreader. No planar body is provided to permit selectably adjusting the angle of the sweep arms by selecting from several attachment points provided.

Yet another rotating spreader is presented in U.S. Pat. No. 4,021,959, issued to Antkowiak, wherein sweep arms are attached atop a transparent container designed to hold live bait fish swimming freely therein and wherein hooks with additional bait fish or lures are supported on the ends of the sweep arms. Blades on the periphery of the container induces a rotary motion thereto and to the sweep arms. Although the intended use of this device is for use in still-fishing, the patent specifies that it might also be used in slow trolling. The sweep arms, called spokes, extend radially from their central connection with the shaft of a connector. No curvature or angle with the direction of travel of the assembly through the water is mentioned or suggested. Applicant believes the nature of the container and spreader device as a whole would severely limit its usefulness in trolling to extremely slow trolling; indeed, it was not truly designed for trolling. Further, storage of the container and sweep arms (spokes) would likely be made more conveniently by removing the sweep arms from the transparent container. In contrast, the present invention is more hydrodynamically stable while being drawn through the water and its stability may be improved for high-speed trolling by increasing the obtuse angle between the sweep arm and the direction of travel and by adjusting the rotation-imparting vanes of the body thereof. Further, the ability to move the sweep arms from a use position, wherein the sweep arms are extended, to a storage position, wherein the sweep arms are juxtaposed, is clearly not suggested by Antkowiak.

Spreaders that have mutual similarites are taught by U.S. Pat. No. 2,683,324, issued to Engleman and by U.S. Pat. No. 2,729,911, issued to Leverth. Both inventors provide spreaders that are not specifically designed to rotate, but provide firstly a use position, wherein the sweep arms are spread far apart, and secondly a collapsed or folded position, wherein the sweep arms are juxtaposed. In both cases, the sweep arms are substantially joined at one point and are forced to bend to a spread position or to a juxtaposed position by means of a slide traversing the length of the sweep arms. The juxtaposed position provides for use of the spreader with hooks close together or for storage of the spreader in a minimum of space.

In the ensuing discussion, wherein the present invention is described in detail, additional distinctions from the prior art will become evident.

It is object of this invention to provide a planar rotating spreader for fishing for use while trolling, which rotating spreader has sweep arms that are pivotably connected to a planar body so they can be pivoted from a use position, wherein they are extended, to a storage position, wherein they are juxtaposed.

It is a further object of this invention to provide such a rotating spreader wherein each sweep arm is supported in an extended position by means of a fixed projection or stop means on the corresponding surface of the planar body, whereby the obtuse angle between the sweep arm in its use position and the longitudinal axis of the body is determined by stop means in cooperation with said pivotable connection.

It is a further object of this invention to provide such a rotating spreader wherein said pivotable connection may be made at more than one location to provide a selectively adjustable angle.

It is a further object of this invention to provide a rotating spreader wherein the sweep arms are replaceable.

BRIEF DESCRIPTION OF THE DRAWINGS

The description of this invention will be made more clear by reference to the following drawings, wherein in each of the several drawings, the same reference number is used to refer to the same element of the invention. Wherever applicable, the same numbers are used here as were used in the copending patent application.

FIG. 1 is a plan view of the rotating spreader of this invention.

FIG. 2 is a rear view of the rotating spreader of this invention.

FIG. 3 is an edgewise view of the rotating spreader of this invention.

DETAILED DESCRIPTION OF THE INVENTION

This invention is related to fishing spreaders, devices of attaching more than one bait or lure to a single fishing line wherein the lures are separated at a distance laterally from each other and from the main fish line. In rotating spreaders, the baits or lures are caused to revolve about the axis of the main fish line as the device is moved relative to the water, causing a net motion in a generally circular pattern relative to the line. Unlike any of the prior art devices, this invention is specifically designed for use while trolling. In trolling, the motion of the lures through the water is rather rapid and of unidirectional rotation, creating a helical pattern; this is to be contrasted with the much slower and usually bi-directional circular motion of the lures while still-fishing using a rotating spreader and activating the rotation of the spreader by 'jigging' the device up and down in the water.

Applicant's co-pending patent application deals with the basic concept of a spreader having a substantially planar body. Storage of such a spreader is simplified by providing sweep arms that are collapsible from a use position to a storage position, wherein the sweep arms are closely juxtaposed to minimize storage space and simplify handling of the spreader when it is not in use.

The present invention is shown in plan view FIG. 1. The body 10 is shown as triangular in shape, although other planar shapes may be suitable. Two vanes 12 and 14 along the trailing edge of the body extend out of the plane of the body in opposite directions to produce the desired rotation. Sweep arms 22 and 24 extend laterally substantially in the plane of the body and making obtuse angles 32 and 34 with the axis 26 of the body 10. Each sweep arm is pivotably attached to the body 10 so that the sweep arm may pivot about an axis substantially perpendicular to the plane of said body at the point of attachment thereto. In the best mode, the two sweep arms 22 and 24 pivot around the same axis, one arm on each side of the planar body 10, but there may be benefit to be found in another arrangement. The sweep arms 22 and 24 therefore move in a sweeping motion as indicated in FIG. 1; they remain substantially in the plane of the body 10 during the motion from a use position as shown to a storage position indicated in phantom at 82 and 84.

The sweep arms 22 and 24 are removable, replacable, and may adjusted to different sweep angles. The distal end of each sweep arm is adapted to receive a leader 41 to which may be attached a baited hook or other fishing lure 43. The length of the sweep arm and the length of the leaders to be used may be any suitable length. It is preferred, however, that the total length of the leader and any lure or bait attachments thereto be no longer than the total length of the sweep arm to which it is attached.

For reasons of stability, it is preferred that the sweep arms be of equal length. This is not to say that sweep arms of different lengths cannot be used, however. It is expected that such use would produce a spiraling or helical path of the body through the water, which motion applicant considers unstable behavior but which may produce improved performance in terms of the number of fish caught.

FIG. 2 and FIG. 3 show the relationships among the trailing vanes on the body and the body itself. The vanes 12 and 14 shown are an integral part of the body. In the best mode, the body 10 is of an injection-molded plastic; thus, the vanes of the best mode of this invention are not adjustable.

Another feature shown in the drawings is the means by which the sweep arms are made adjustable in the best mode. The proximal ends of the sweep arms 22 and 24 are pivotably attached by means of a bolt 76 or other fastener through a selected one of several holes 78 along the central axis of the body; in the use position, the sweep arms 22 and 24 each rest against a projection or stop means 86 on the surface of the body 10, thereby to establish the obtuse angle 32 or 34 between the sweep arm and the axis of the body. In the best mode, the stop means 86 is molded integrally with the body 10. It may be desirable for this projection 86 from the body to have an expanded top or a headed plug 88 inserted into a hollow therein 89 to provide an expanded top, as shown in FIG. 3; such a construction may help to retain the sweep arm in position against the body 10.

The fisherman may easily adjust the sweep angle of his trolling spreader by using simple tools that he usually carries with him by relocating the bolt 76. Other adjustment means may be used without straying from the teachings of this invention. Applicant experimented with attachment means involving various hooks and loops that were suitable but were more complicated than that of the best mode. Simply said, other means exist for providing sweep arms having adjustable sweep angles.

One such other means bears mentioning. Where it is desirable to maintain only one non-selectable and non-adjustable pivot point, one could provide multiple stop means to define several different sweep angles. As one changes the angle he would momentarily pull the sweep arm away from the plane of the body to provide clearance over some such stop means and then release the arm to engage a selected stop means for a selected sweep angle. Using this method, this pivotable connection of the sweep arms to the body could be made permanent, as by means of a rivet.

While I have shown and described in detail only one embodiment in accordance with the present invention, it is understood that the same is not limited thereto, but is susceptible to numerous changes and modifications as known to those skilled in the art. Therefore, I do not wish to be limited to the details shown and described herein, but intended to cover all such changes and modifications as are encompassed by the scope of the appended claims.

I claim:

1. A rotatable spreader for use in fishing and specifically for trolling, said spreader comprising:
    a substantially planar body having a surface area on each side thereof and having a leading edge adapted at the forwardmost portion thereof for connecting to a fishing line and a trailing edge adpated to cause rotation of said body about a longitudinal axis thereof when said body moves relative to the surrounding water; and
    a plurality of elongate sweep arms extending beyond the area of said body, said sweep arms each being pivotably attached at the proximal end thereof to said body such that each may be selectively moved from a use position, in which position said sweep arm forms an obtuse angle with said longitudinal axis of said body with said arm resting upon a stop means protruding from a respective said surface area of said body, to a storage position, in which position said sweep arms are juxtaposed, and wherein each said sweep arm is adapted on the distal end thereof for the attachment of additional fishing tackle for attracting and hooking a fish, said sweep arms rotating with said planar body and thereby causing said additional tackle to revolve in a substantially helical path relative to said surrounding water.

2. The rotatable spreader of claim 1 wherein said trailing edge has two oppositely disposed vanes, each of which contributes to causing rotation of said body.

3. The spreader of claim 2 wherein said vanes are of unitary construction with said body.

4. The spreader of claim 1 wherein said sweep arms are removable and replaceable.

5. The spreader of claim 1 wherein said obtuse angle is selectively adjustable.

6. The spreader of claim 5 wherein the adjustment of said obtuse angle is effected by providing on said body multiple attachment points for said sweep arm.

7. The spreader of claim 1 wherein at least one of said surface areas is highly light reflective.

8. The spreader of claim 1 wherein at least one of said surface areas is brightly colored.

9. The spreader of claim 1 wherein said stop means are integral with said body.

10. The spreader of claim 1 wherein said stop means comprise a projection from said surface area and said projection has a portion thereof having an enlarged cross section, thereby to aid in retaining said sweep arm.

11. The spreader of claim 10 wherein said projection includes a hollow region therein and wherein said enlarged cross section is provided by means of a plug having an enlarged head, and said plug is engaged in said hollow region.

* * * * *